INVENTOR.
URBAN P. TRUDEAU
ATTORNEYS

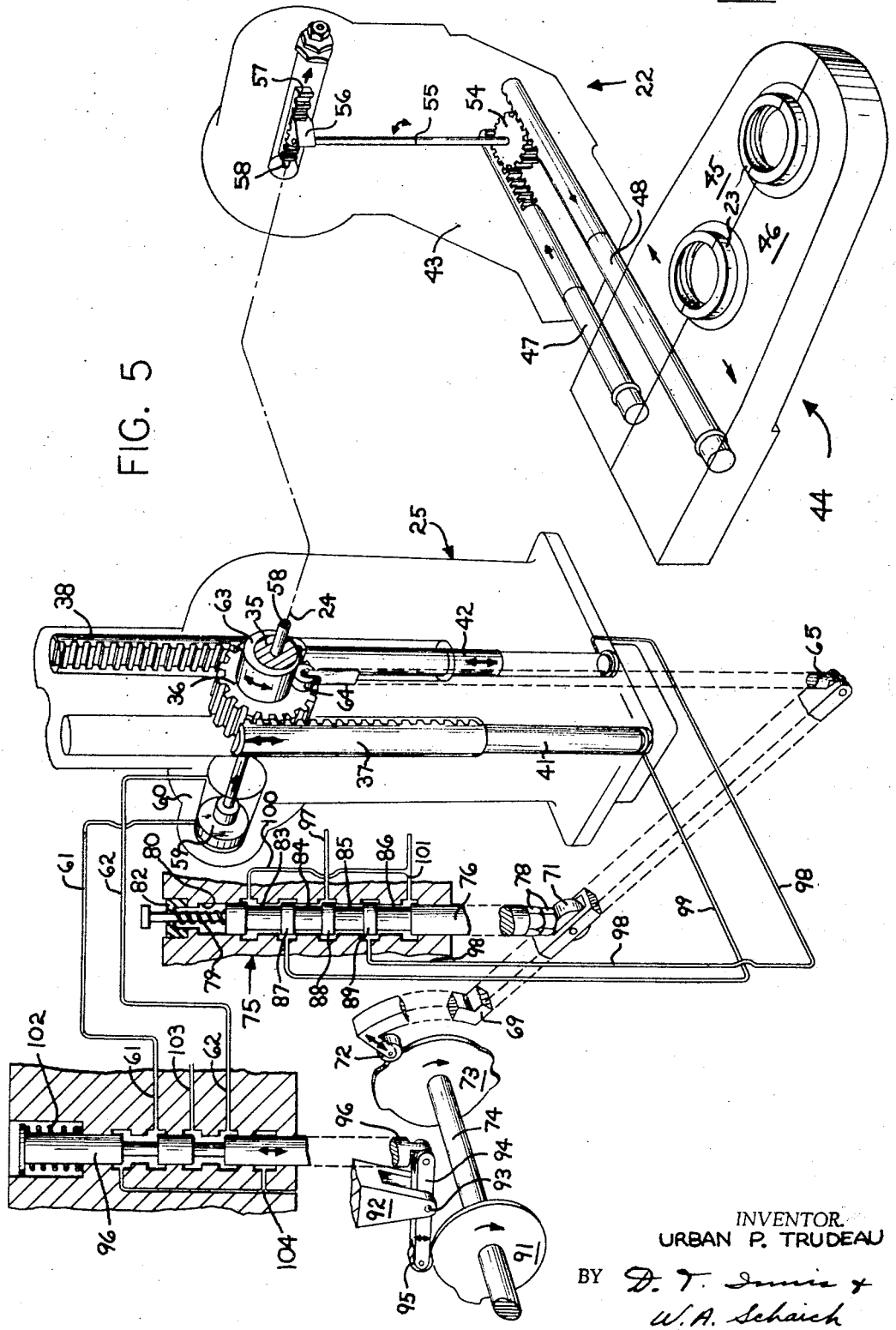

United States Patent Office 3,445,218
Patented May 20, 1969

3,445,218
PARISON TRANSFER AND INVERT MECHANISM
Urban P. Trudeau, Toledo, Ohio, assignor to Owens-Illinois, Inc., a corporation of Ohio
Filed July 14, 1964, Ser. No. 382,534
Int. Cl. C03b 9/16, 9/26
U.S. Cl. 65—235                       6 Claims

ABSTRACT OF THE DISCLOSURE

This case is directed to apparatus for inverting parisons, formed in a neck-down position, and transferring the parisons to blow molds during the inversion thereof. The invert and transfer motion is carried out in a predetermined period of the glass forming cycle with the rate of movement controlled in accordance with the incremental movement of the invert arm by providing a mechanical servo-feed-back loop between a cam carried by the arm and a timing cam for continuously adjusting the position of a spool valve which controls the flow of fluid to the fluid motor driving the invert arm.

---

This invention relates to apparatus for transferring parisons from a parison mold to a blow mold which involves inverting the parisons 180° during transfer.

More particularly, this invention relates to apparatus for transferring parisons from a parison mold to a blow mold by an invert mechanism which is controlled in its invert motion by servo-feedback system.

It has been common practice in the glass forming art to form parisons in an inverted position with the neck of the parisons formed at the bottom and to then transfer and invert the parisons by their necks to an upright position where the parisons are expanded to the final bottle form in blow molds.

The speed and motion of the inverting mechanism, of necessity, must be closely controlled so as to provide as quick an invert of the parisons from the parison mold to the blow mold as is possible without distorting the hot glass parisons.

It has been a serious drawback in the operation of glass forming machines and in particular in the operation of the invert mechanism where hydraulic fluid forms the motive power, in that the invert motion of the transfer arm is not consistent during the warm-up period and during extended operation of the glass forming machine.

With the foregoing in mind, applicant has provided a system of hydraulically driving an invert arm through its 180° rotation, wherein the time of carrying out the invert motion, as well as the pattern of the motion, is controlled so as to effect optimum inverting conditions.

It is an object of this invention to provide apparatus for operating an invert transfer arm whose motion is jointly controlled in accordance with a pre-selected cam contour and the actual incremental position of the arm during its invert motion.

It is a further object of this invention to provide apparatus for forming parisons which is stable in operation during warm-up conditions and during extended periods of operation.

It is a still further object of this invention to provide a compact invert arm driving mechanism which is adjustable so as to ensure optimum transfer conditions for hot parisons.

Other and further objects will be apparent when taken in conjunction with the annexed sheets of drawings, wherein.

Figure 1:
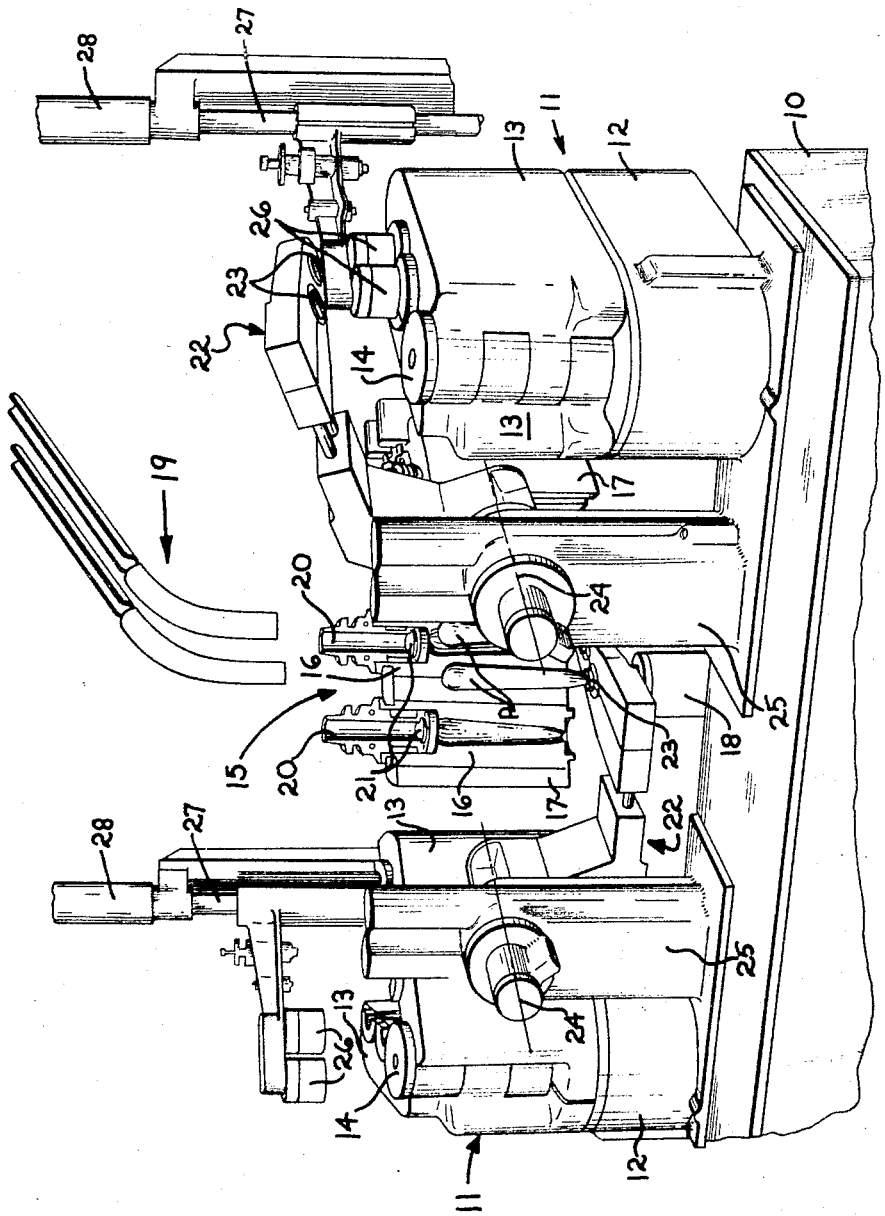
FIG. 1 is a perspective view of the forming apparatus embodying the invention.

Referring now to the drawings, and in particular to FIG. 1, the forming machine in its entirety has a base 10 which provides the support for the other operating mechanisms of the machine. The base 10 supports a pair of blow molding units 11. The blow molding units have bases 12 which contain the mechanism for opening and closing the mold arms 13. The mold arms 13 are mounted for swinging motion with respect to the bases 12 on vertically extending pivot pins 14. Located between the two blow molding units 11 is a parison forming unit, generally designated 15. The parison forming unit 15 takes the form of a split parison mold having halves 16 mounted on relatively moveable mold supporting arms 17. The mold supporting arms 17 are hingedly mounted relative to the base so that they may move toward and away from each other in a manner similar to that shown and described with respect to the blow mold arms 13.

In vertical alignment with the parison molds 16, when the mold arms 17 are closed, are a pair of vertically moveable pressing members which are adapted to extend upwardly out of a base 18 to press-form parisons P of molten glass which glass is delivered to the parison molds 16 in the form of gobs by the gob guiding structure 19 located above the parison molds. When the gobs have been severed from a feeding mechanism (not shown), they pass through the gob guide structure 19 and are guided into the open tops of the molds 16 by means of split funnels 20. Adjacent the top of the mold half 16 and slideably received within one of the mold arms 17 are a pair of baffles 21 which are adapted to close off the top of the parison cavities after the gobs have been delivered thereinto. Thus the baffles form the upper end of the parison forming cavities.

With the particular mechanism to which the invention pertains, the formed parisons P are transferred from the parison molding unit 15 by a pair of neck mold carrying arms 22 which are adapted to alternately seat upon the top portion of the plunger actuating mechanism 18. When the neck molds are seated thereon the mold arms 17 and the mold halves 16 are closed thereabout in such a manner as to engage the split neck molds 23 which extend above the upper surface of the transfer arms 22. The arms 22 are mounted on horizontal axes 24 about which the arms are intended to rotate. A pair of spaced-apart vertically extending support members 25 have horizontal openings formed therein adjacent their upper ends, coincident with the above-referred-to axes 24. It is within these openings that the shafts which are attached to the invert arms extend, as will be later described.

Thus it can be seen that rotation of the invert arms about the axes 24 will result in transferring the parisons P from the parison forming unit 15 to the blow molding units 11.

It should be understood that this transfer is accomplished just prior to the closing of the blow molds and upon closing of the blow molds the neck rings 23 are opened leaving the parisons supported within the blow molds by their neck portions. The arms 22 are then lifted from the top of the blow molds 13 and blow heads 26, of which there are two for each of the double cavitied blow molds, seat over the upper ends of the parisons and by the introduction of fluid under pressure through the blow heads the parisons will be expanded within the blow molds into their final bottle shape.

The blow heads 26 are mounted for pivotal movement on vertically extending support rods 27 and also are adapted to be moved vertically into and out of engagement with the top of the blow molds by means of fluid motors 28 which are connected to the shafts or rods 27. In this manner the blow heads may be swung out of the path of travel of the parisons during the transfer of the parisons to the blow molds and then may be swung into alignment and downwardly into engagement with the top of the blow molds 13 to perform their parison expanding function.

While applicant has shown the blow heads seated on the tops of the blow molds themselves when in blowing position, it should be pointed out that the parisons could as well be retained within the neck rings 23 of the transfer arm 22. The blow heads then seat on the bottom of the transfer arms and thereby expand the parisons while they are still retained within the neck molds 23. However, this delay in releasing the parisons at the blow mold station will slow up the glass forming cycle.

Figure 2:
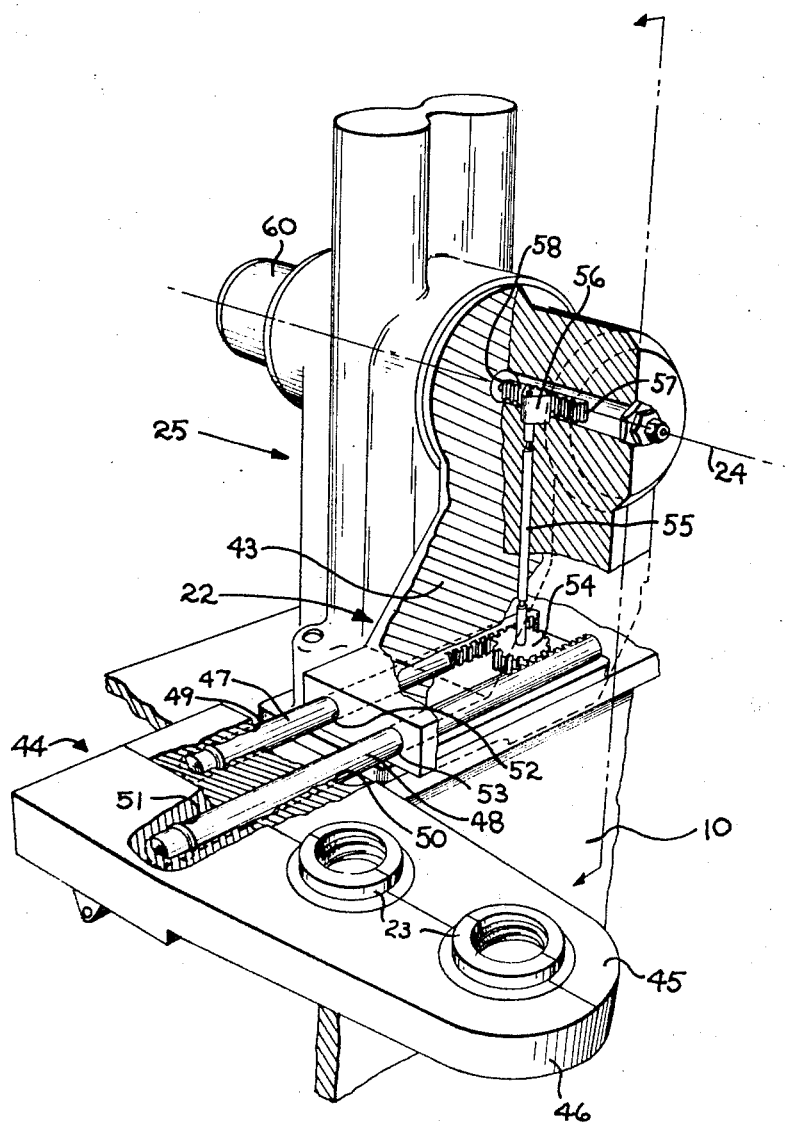
FIG. 2 is a perspective view of the neck mold carrying invert arm of the invention with portions broken away to illustrate the mechanism for opening and closing the neck molds.
Figure 3:
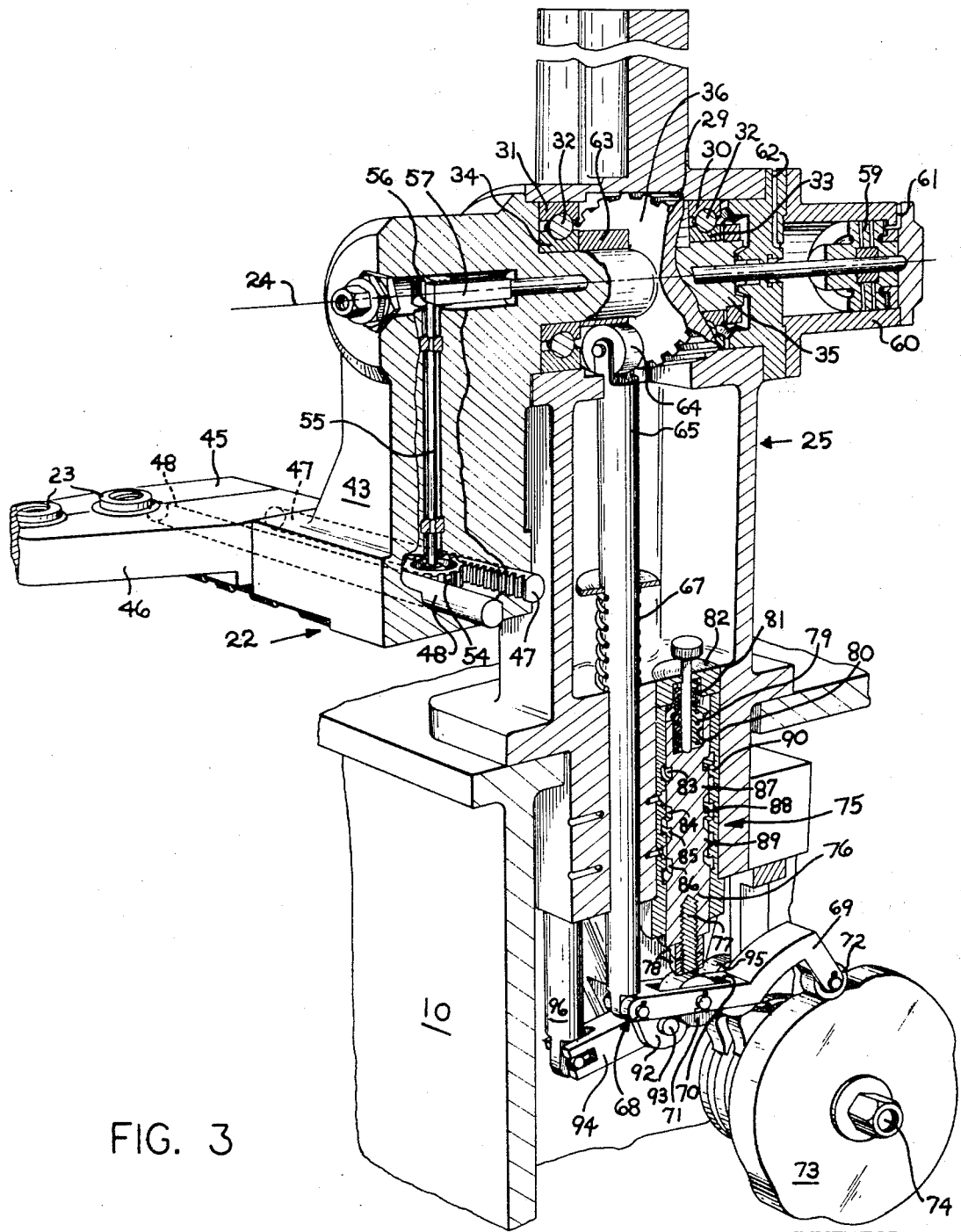
FIG. 3 is a cross-sectional perspective view of the mechanism of FIG. 2 on a slightly enlarged scale taken at line 3—3 of FIG. 2.
Figure 4:
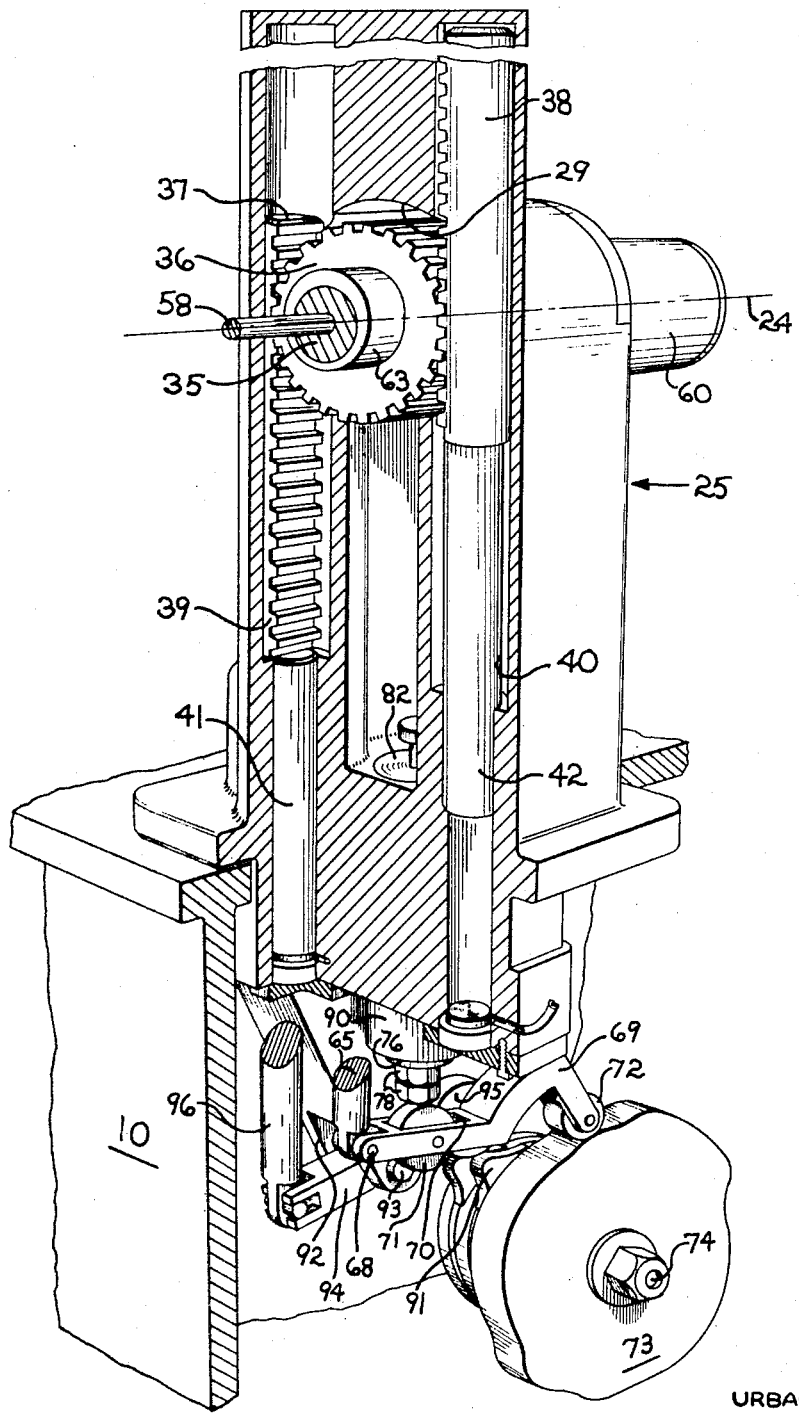
FIG. 4 is a perspective view of the invert drive mechanism and the control mechanism therefor with parts broken away for clarity of illustration; and, FIG. 5 is a schematic circuit diagram of the mechanical and hydraulic system of the invention.

Referring now to FIGS. 2–4, the parison transfer mechanism and neck mold opening mechanism will be described in detail.

The vertical support member 25 rests on the machine base 10 and is provided with a horizontal opening 29 adjacent its upper end which extends therethrough. Within the opening 29 are fixed a pair of axially spaced bearing races 30 and 31 (see FIG. 3) which support the ball bearings 32 which in turn ride in complementary bearings races 33 and 34. The races 33 and 34 are fixed to a hollow shaft 35 formed integral with the transfer arm 22.

Within the opening 29 of the support 25 is positioned a circular gear 36 which is fixed to and co-axial with respect to the shaft 35. This circular gear 36 is the main invert arm driving gear and, as can be seen when viewing FIG. 3, is positioned between the bearings 33 and 34 on the shaft 35. The gear 36 is in engagement with a pair of racks 37 and 38 which are mounted within vertical openings 39 and 40 formed in the support 25 (see FIG. 4).

As can be seen when viewing FIG. 4, the racks 37 and 38 engage the gear 36 at diametrically opposed points in the circumference of the gear 36 and are guided in their vertical movement by the walls of the openings 39 and 40. A pair of long cylindrical pistons 41 and 42 ride within co-axial extensions of the openings 39 and 40 which are reduced in diameter so as to closely embrace the pistons 41 and 42. The pistons 41 and 42 are not necessarily connected to the racks 37 and 38, inasmuch as they are always acting in opposition, as will be later described. Thus it is only necessary that their upper ends bear against the lower ends of the racks 37 and 38. When the transfer arm 22 is in the parison forming position, as shown in FIGS. 2 and 3, the portion of the arm 22 which extends beyond the side of the support 25 has a downwardly extending portion 43 whose length determines the radius of invert movement of the parisons during transfer.

A neck mold supporting member, generally designated 44, is formed of two complementary neck mold holders 45 and 46 which are adapted to be moved toward and away from each other to open and close the split neck molds, it being understood that the neck molds are held closed during the parison forming operation and during the invert operation and obviously must be opened to release the parisons at the blow molding station. With this in mind, it can be seen that the holders 45 and 46 are individually carried and supported at one end of horizontally extending racks 47 and 48 respectively.

A pair of openings 49 and 50 are formed in the holder 45 with the opening 49 extending partially through the width of the member 45 with the opening 50 extending entirely through the holder 45 and being of a slightly larger inside diameter than the outside diameter of the rack 48 so that the holder 45 may move freely parallel to the horizontal axis of the rack 48. The rack 47 is fixed within the opening 49 and serves as the driving member for the neck mold holder 45.

An opening 51 is provided in the neck mold holder 46 within which the rack 48 has its outer end seated and fixed with respect thereto. The racks 47 and 48 are supported by and guided within openings 52 and 53 formed in the portion 43 of the transfer arm 22. The racks 47 and 48 have their gear faces facing each other and a pinion 54 is positioned therebetween in engagement with both of the racks. The pinion 54 has a drive shaft 55 connected thereto. As can be seen when viewing FIGS. 2 and 3, the shaft 55 extends vertically upward within the portion 43 of the arm 22 and carries a gear sector 56 at its upper end. The gear sector 56 is in engagement with a short rack 57. The rack 57 is connected to a rod 58 which extends co-axially through the hollow shaft 35 and is free to reciprocate within the shaft 35. The outer end of the rod 58 is connected to a fluid motor piston 59 which is slidable within a cylinder 60 mounted on the support 25. The cylinder 60 has two ports 61 and 62 which open into opposite ends of the cylinder on opposite sides of the piston 59.

As will be explained later with reference to FIG. 5, air under pressure is introduced through the ports 61 or 62, depending upon the timing of the forming machine so as to open or close the neck mold holders. It can readily be seen that upon introduction of fluid under pressure through the port 61 that the piston 59 will move from right to left as viewed in FIG. 3 in turn moving the rod 58 and the rack 57 which is attached thereto. Reciprocation of the rack 57 will rotate the gear sector 56. Rotation of the gear sector 56 will in turn rotate the pinion 54 on the shaft 55. As can clearly be seen when viewing FIGS. 2 and 3, rotation of the pinion 54 will oppositely drive the two racks 47 and 48 to open the neck mold holders 45 and 46.

Having described the principal mechanical parts of the parison transfer apparatus, the servo operated control, which is associated with the drive, will be described with particular reference to FIGS. 3 and 4, where it can be seen that the shaft 35, which is rotated, through the rotation of the circular gear 36, carries a cam 63 in the form of a sleeve eccentrically mounted with respect to the axis of the shaft 35. The cam 63 is fixed to the shaft 35 and rotates therewith and drives a cam follower in the form of a roller 64 mounted on the end of a rod 65. As can best be seen when viewing FIG. 3, the rod 65 extends vertically downward and is guided within the support structure 25. The roller 64 and rod 65 are biased by a spring 67 into cam following engagement. The lower end of the rod 65 extends below the support member 25 and is connected at 68 to a pivotal lever 69. The lever 69 is a relatively wide member having an opening 70 intermediate its ends with a roller 71 positioned within the opening with its axis normal to the longitudinal axis of the lever. The end of the lever 69 opposite the end connected to the rod 65 is provided with a cam following roller 72. The roller 72 rides in contact with a cam 73 carried by a shaft 74 which is driven by the main machine drive mechanism (not shown). Thus it can be seen that as the invert arm 22 is rotated by the circular gear 36, the cam 63 will move the rod 65 causing the lever 69 to pivot about the axis of the roller 72. By the same token, as the cam 73 is rotated the roller 72 will be lifted and lowered in response to the shape of the cam 73 and, in effect, pivot the lever 69 about its point of connection 68 with the rod 65. This combined movement of the lever 69 is followed by a spool valve, generally designated 75, which has one end of its spool 76 biased in contact with the roller 71.

As shown in FIGS. 3 and 4, the lower end of the spool 76 has a machine threaded stud 77 threaded into the lower end of the spool. A pair of lock nuts 78 are threaded on the extending end of the stud 77 to provide means for adjusting the spacing between the spool 76 and the roller 71. The spool 76 is biased downwardly by a spring 79 which is seated within a recess 80 in the upper end of the spool 76 and its other end is seated in a complementary recess 81 formed in a bushing 82 fixed within the lower portion of the suport member 25. The spool has a series of vertically spaced annular lands and grooves formed therein with the grooves designated 83, 84, 85 and 86. These grooves are separated by lands 87, 88, and 89. Complementary lands and grooves are provided in the inner surface of a hollow sleeve 90 carried within an opening formed in the support 25. Suitable passages and connections are provided through the sleeve 90, as will be apparent from the description below in connection with FIG. 5. The purpose of the spool valve 75, as will be apparent from the later description, is for controlling the rate of flow of fluid (in this case oil) to the pistons 41 and 42 of the invert drive mechanism.

The shaft 74 which rotates the cam 73 carries a second cam 91. The lower end of the support 25 is formed with a bifurcated portion 92. A pivot pin 93 extends across the bifurcated portion and passes through a hole in a lever 94. The pivot pin 93 serves as the fulcrum for the lever 94 which carries a roller 95 at one end thereof and is pivotally connected to the lower end of a vertically extending rod 96 at its other end. The rod 96 extends into an opening formed in the lower end of the support 25 and serves as the spool of a second spool valve. Movement of the spool 96, as explained later, serves to control the introduction of air under pressure to the cylinder 60 through the ports 61 and 62 alternately, thus controlling the opening and closing of the neck molds in sequential relationship with respect to the main machine drive.

Having described the mechanical relationship of the apparatus of the invention, reference will be made to FIG. 5 which is a schematic drawing illustrating the hydraulic connections and mechanical operations of the parts.

With the mechanism in the attitude shown in FIG. 5, the neck rings are closed and the invert arm is in the position that it assumes at the time that parisons are being formed. After the parisons have been formed and the parison molds are opened (all of which is timed off of the main drive shaft 74), the cam 73, which is being driven in the direction of the arrows shown thereon, will, due to the raised area thereon, move the lever 69 upward which in turn will shift the spool 76 in an upward direction. Fluid under pressure is fed to the spool valve through the inlet passage 97 and with the spool 76 in the position shown in FIG. 5, the oil under pressure is passing the land 88 through groove 85 to the outlet passage 98. Thus the piston 42 is in its uppermost position while the piston 41 is in its down position, with the hydraulic line 99 thereto being in communication through the groove 83 of the spool 76 with the exhaust passage 100. As the valve is moved upward due to the rotation of the cam 73 and the rocking of the lever 69, the land 89 will cut off the flow of oil to the outlet passage 98, while at the same time opening the passage 98 by way of the groove 86 to the exhaust port 101. The land 87 on the spool 76 disconnects the flow from the line 99 to the exhaust passage 100 and diverts the incoming oil in line 97 past the groove 84 to the line 99 which moves the piston 41 upwardly driving the rack 37 and rotating the circular gear 36 to invert the invert arm 22 through approximately 180° rotation.

As the invert arm is being rotated, the cam 63 carried by the shaft 35 will move the rod 65 downward as the invert motion progresses due to the eccentric relationship of the cam 63 with respect to the axis of the shaft 35. This downward movement of the rod 65 will result in the lever 69 being moved slightly in a clockwise direction resulting in the spool 76 moving downward to a slight extent. This slight downward movement of the spool 76 causes the land 88 to move downwardly and has the effect of feathering the flow of oil from the passage 97 past the groove 85 to the outlet passage 98, thus controlling the rate of invert of the arm 22 during the critical portion of its invert motion. The precise positioning of the land 88 will obviously be accomplished through the combined effect of the contour of the cam 73 and the contour of the cam 63 inasmuch as both of these elements control the rocking movement of the lever 69 which in turn is in contact with the lower end of the spool 76. In this manner the rate of rotation of the invert arm is constantly controlled in accordance with the position of the arm in its invert movement. This incremental control function is extremely important in order to provide a smooth invert which is independent of warm-up of the oil and inherent changes in viscosity of the oil as it is being heated through the operation of the machine in proximity to the hot glass and forming molds. This servo function of the cam 63 provides better and closer control during the entire invert motion than is possible where the position of the spool valve is controlled entirely by a single cam.

After the inversion of the parisons by rotation of the arm 22 so as to position the parisons within the blow molds, the cam 91 will pivot the lever 94 moving the spool 96 downward against a biasing spring 102. Downward movement of the spool 96 will connect the air under pressure in line 103 to the line or port 61 and simultaneously therewith connect the port 62 to the exhaust passage 104. With air under pressure in line 61, the piston 59 will move from left to right moving the rod 58 and rack 57 therewith. Movement of the rack 57 will rotate the pinion 54 in a clockwise direction, as viewed in FIG. 5, thus moving the two racks 47 and 48 in the directions indicated by the arrows thereon to open the neck mold holders 45 and 46. Opening of the neck mold holders 45 and 46 releases the ware at the blow station and a further rotation of the cam 91 will reverse the movement of the spool 96 and move it to the position shown in FIG. 5 which will reverse the movement of the piston 59 and shaft 58 with the result that the neck mold holders 45 and 46 will close. The neck mold holders will remain closed until it is time for them to release another parison at the blow molding station in the next cycle. However, it is obvious that it is necessary that the inverted parison transfer arm 22 be reverted to the position shown in FIG. 5. This revert is accomplished by the continued rotation of the cam 73 which has a contour such that the arm 69 will move downward and permit the spool 76 to shift downward to the position shown in FIG. 5, wherein the oil under pressure entering the inlet passage 97 will be connected by groove 85 with the outlet passage 98 while the passage 99 will be connected by the groove 83 to the exhaust passage 100. This will result in the upward movement of the piston 42 and the downward movement of the piston 41 reverting the arm 22 to the position shown in FIG. 5.

In summary, the apparatus of the invention provides mechanism for inverting parisons formed in an inverted position and transferring the parisons during inversion to blow molds wherein the invert motion is not only accomplished in a predetermined portion of the forming cycle, but is also controlled in its motion in accordance with the incremental movement of the invert arm by the servo feed-back provided by the cam 63 and the rod 65 being connected to feather the spool valve 76 in its supply of oil under pressure to the inverting drive piston 41.

Various modifications may be resorted to within the spirit and scope of the appended claims.

I claim:
1. Apparatus for controlling the invert motion of an invert arm of a glass forming machine comprising, a driven shaft (35), a radially extending invert arm (22) connected to said shaft, a driven gear (36) secured to said shaft for rotation therewith, a fluid operated motor having means (37, 38) thereon for rotating said gear, a source

(97) of fluid under pressure connected to said fluid operated motor, a biased pilot valve (75) for controlling flow of fluid to and from said motor, a floating lever (69) having means intermediate its ends engageable with said pilot valve, a drive shaft, a first cam (73) on said drive shaft engageable with one end of said lever for rocking said one end, a second cam (63) on said driven shaft, and means interposed between said second cam and the other end of said lever for rocking said other end when said shafts are rotated.

2. The apparatus as defined in claim 1, wherein said fluid operated means comprises, a pair of parallel extending racks in engagement with said gear on diametrically opposed sides thereof, said racks being in driving opposition to each other and having piston-like ends thereon reciprocable within the shaft support structure, means connecting said pilot valve to the shaft support structure to selectively apply fluid to said piston-like racks in accordance with the first cam, and to control the rate of flow of fluid to said racks in accordance with the rotational position of said invert arm.

3. In a glass forming machine of the type in which a parison is formed in a neck-down position and the parison is inverted and transferred while held by its neck to a position to be expanded into article form, the improvement in the invert and transfer mechanism comprising, a vertically extending support (25) having a horizontal opening extending therethrough, a driven shaft (35) mounted for rotation in said opening, an invert arm (22) secured to said shaft, a pair of vertically disposed pistons (41, 42) reciprocally supported in said vertical support, a gear (36) fixed on said driven shaft, a rack (38, 39) associated with each of said pistons, said racks being engageable with opposite sides of said gear for rotating said driven shaft, a source (97) of fluid under pressure, a drive shaft (74) a first cam (73) fixed to said drive shaft, a floating lever (69), one end of said lever being engageable with said first cam, a second cam (63) secured to said driven shaft, a vertically reciprocable rod (65) pivotally connected to the other end of said lever and extending upwardly into engagement with said second cam, a flow control valve (75) interposed between said source of fluid under pressure and said fluid operated pistons for controlling flow of fluid to and from said pistons, and means disposed intermediate the ends of said floating lever in engagement with said valve, the ends of said lever being rocked by said cams when said shafts are rotated.

4. The apparatus of claim 3, wherein said invert arm comprises a downwardly extending portion and a horizontally extending portion formed integral therewith, a split neck mold supporting member, means connecting said mold supporting member to said horizontally extending portion of said invert arm and means carried by said arm for opening and closing said split neck mold supporting member.

5. The apparatus as defined in claim 3, wherein said means carried by said arm for opening and closing said neck mold supporting member comprises a pair of racks connected to said member with one rack fixed to one-half of said member and another rack fixed to the other half of said member, said racks extending parallel to each other and guided in openings formed in said horizontal portion of said invert arm, a pinion positioned in said horizontal portion between and in engagement with said racks, and means connected to said pinion for rotating same to drive said racks.

6. The apparatus as defined in claim 5, wherein said means for driving said pinion comprises a driven shaft connected thereto and extending within a passage formed in the invert arm, a gear sector fixed to the opposite end of said driven shaft, a rack in engagement with said gear sector, a reciprocating fluid motor mounted on said support coaxial with said invert arm shaft and a rod connecting said motor to said rack for reciprocating said rack in engagement with said gear sector whereby said pinion is rotated to open and close said neck mold support members.

References Cited
UNITED STATES PATENTS 2,702,444    2/1955    Rowe _____ 65—235 X
3,149,951    9/1964    Mennitt et al. _____ 65—235

DONALL H. SYLVESTER, *Primary Examiner.*

F. W. MIGA, *Assistant Examiner.*

U.S. Cl. X.R.
65—232, 361